United States Patent [19]

Streetman

[11] Patent Number: 4,497,934
[45] Date of Patent: Feb. 5, 1985

[54] METHOD FOR THE PRODUCTION OF MELAMINE/ALDEHYDE FILAMENTS

[75] Inventor: William E. Streetman, Williamsburg, Va.

[73] Assignee: American Cyanamid Company, Stamford, Conn.

[21] Appl. No.: 606,429

[22] Filed: May 2, 1984

[51] Int. Cl.$^3$ ............................................. C08L 61/28
[52] U.S. Cl. ..................................... 525/58; 525/406; 525/428; 528/254; 264/176 F
[58] Field of Search ...................... 525/406, 428, 58; 528/254, 230; 264/176 F

[56] References Cited

U.S. PATENT DOCUMENTS 4,361,674  11/1982  Lawrence et al. ................... 525/58

Primary Examiner—Theodore E. Pertilla
Attorney, Agent, or Firm—Frank M. Van Riet

[57] ABSTRACT

A method for the production of melamine/aldehyde filaments by reacting a crystalline melamine and a solid aldehyde generating compound in a single pass reactor and extruding the resultant molten mass through a spinnerette into a reaction chamber maintained under specific temperature conditions and in the presence of air is disclosed.

10 Claims, No Drawings

METHOD FOR THE PRODUCTION OF MELAMINE/ALDEHYDE FILAMENTS

BACKGROUND OF THE INVENTION

The production of filaments, fibers, etc. from melamine/aldehyde polymers has been known for many years and patents and publications describing various innovations in this area of technology have continuously surfaced from time to time. U.S. Pat. No. 3,088,620 to Kuraray Co. Ltd. of Japan is exemplary of these publications. This patent teaches the production of flame-retardant, infusible fibers made from melamine/formaldehyde resins blended with a thermoplastic, fiber-forming polyvinyl alcohol resin having a degree of polymerization of from 500–3200 and a degree of saponification of 75–100 mole percent.

The melamine/formaldehyde resin used in said patent is produced by reaction of melamine and formaldehyde in the presence of a solvent at 50°–900° C. for 10 minutes to 3 hours. An acidic catalyst is usually employed and the resultant resin and the polyvinyl alcohol polymer are then blended before extrusion into a fiber. Alternatively, the melamine-formaldehyde reaction can be conducted in the presence of the polyvinyl alcohol polymer.

Spinning into a fiber is conducted by forming a spinning solution of the melamine/formaldehyde resin-polyvinyl alcohol polymer blend, ususally in water, extruding through a suitable spinnerette and then curing at 170°–280° C.

One of the problems which have plagued the melamine/formaldehyde resin fiber industry over the years is the inability to control the reaction of the melamine formaldehyde such as to obtain a resin have a narrow molecular species distribution. That is to say, when batch resin preparation techniques are employed, the resultant melamine/formaldehyde resin has a very wide molecular weight distribution which leads to variations in resin properties and characteristics. Additionally, reproducibility is very difficult. Attempts to reduce this scattering of molecular weights and non-reproducibility have not proven entirely satisfactory.

Additionally, when attempts are made to modify the melamine/formaldehyde resins with additives so as to impart particular fiber properties thereto, such as the use of polyvinyl alcohol polymers described above, these additives must have certain properties themselves so as to enable their use, i.e., primarily they must be soluble in the solvent media used for spinning, preferably water, or at least dispersible in the solvent-melamine resin solution, at the temperatures used for spinning. This requirement seriously reduces the number and variety of additives which have found utility in the industry over the past twenty years. If these two basic problems could be overcome, satisfaction of a long felt need in the art would be attained.

SUMMARY OF THE INVENTION

It has now been found that the molecular weight distribution of melamine/formaldehyde resins can be materially narrowed such as to form filaments have more controlled chemical and physical properties and characteristics. Furthermore, reproducibility can be achieved and spinning viscosity can be kept constant and controlled. Additionally, the novel process of the present invention enables the incorporation into melamine/aldehyde resins of resin additives previously incorporated only in minor amounts, with extreme difficulty or not at all. It has also been found that cross-linking of the resinous fiber can be achieved without the need for Lewis acid bath treatment, drying and thermal treatment previously thought necessary.

These achievements are attained by the use of a crystalline melamine compound and a solid aldehyde generating compound by passing the solid charge materials, above or in conjunction with liquid or solid additives, into a single pass reactor to thereby form a molten liquid which is then extruded under controlled conditions into a resin filament.

DESCRIPTION OF THE INVENTION INCLUDING PREFERRED EMBODIMENTS

The present invention is directed to a continuous process for the preparation of a melamine-aldehyde resin filament which comprises:

(a) charging a crystalline melamine compound and a solid aldehyde generating compound into a single pass reactor at a temperature ranging from about 120° C. to about 180° C. for from about 30 seconds to about 5 minutes to form a molten liquid having a melt viscosity ranging from about 1000–5000 poise, (b) maintaining the temperature of said molten liquid at from about 85°–135° C., (c) extruding said molten liquid through a spinnerette into a reaction chamber, the first ⅓ of which is maintained at a temperature ranging from about 80°–300° C., the second ⅓ of which is maintained at a temperature ranging from about 150°–400° C. and the third ⅓ of which is maintained at a temperature ranging from about 185°–400° C., in the presence of air, and (d) recovering the resultant filament.

Step (a) described above, is essentially taught in copending application, U.S. Ser. No. 466,172, filed Feb. 14, 1983, hereby incorporated herein by reference. Specifically, Step (a) comprises either blending the melamine and aldehyde generating compound, and any coreactants or modifiers, additives etc, together and then subjecting them to reaction in the reactor or feeding each component into the reactor individually. The crystalline melamine and solid aldehyde generating compound, when blended, form an essentially 100% reactive composition and may be blended in any manner which insures the formation of an essentially homogeneous mixture.

Examples of coreactants include triethanolamine, hydroxy propyl melamine etc, while useful modifiers include thermoplastic resins such as polyvinyl alcohol, urea-formaldehyde resins, epoxy resins, cellular derivatives, polyamides, polyviny chloride, polyethylene oxide, polypropylene oxide, polyacrylamide, polyacrylonitrile, etc. Other additives include flow aids, cross-linking catalysts, flame-retardants, plasticizers, pigments, colorants, lubricants and the like.

The components, in the form of the resultant homogeneous blend or as individual charges, are fed into a continuously stirred, single-pass reactor or compounds such as a single-screw extruder, a twin-screw extruder, a kneader extruder, a series of Moyno pumps, a gear extruder i.e. any reactor that transports a reaction product of increasing viscosity, at temperatures ranging from about 120° C. to about 180° C., preferably from about 125° C. to about 155° C. and reaction times of from about 30 seconds to about 5 minutes, preferably from about 2 minutes to about 3 minutes, are employed.

Under these conditions, an addition reaction between the melamine and the aldehyde is achieved with a minimum of any condensation reaction occurring. The specific conditions employed are controlled so as to recover a resin having a melt viscosity of about 100–5000 poise.

The resultant resin exits the reactor as a molten liquid which is of high solids concentration and contains small amounts of water, i.e. 2–5%. It contains small amounts of unreacted charge material i.e. it is of 95–100% resin.

Upon recovery from the single-pass reactor, the resin can be immediately spun into a filament or can be maintained at a temperature ranging from about 85° C. to about 150° C., preferably from about 105° C. to about 135° C. to avoid solidification under 85° C. and resin advancement over 150° C.

The molten resin is then, Step (c) extruded through a spinnerette into a reaction chamber wherein the resultant filament is cured. The reaction chamber is maintained under certain conditions such that filaments having the most favorable properties and characteristics for any specific ultimate use are obtained.

The molten resin is spun into air or an inert gas (e.g. nitrogen) whereby the water present is evaporated from the resin and the resin is cured. Back pressure on the melt at the spinnerette is controlled by the RPM of the melt feeder e.g. an extruder, and the molten liquid temperature and composition variables by a pressure of at least 20 psi, preferably 20–100 psi. Air or inert gas flow in the reaction chamber is maintained in a direction from molten liquid entry to exit at a rate ranging from about 5–50 feet per minute, preferably 10–35 fpm.

The reaction chamber is maintained at a temperature gradient from entry to exit of about 80°–300° C., preferably about 100°–800° C. at the top ⅓ of the chamber, from about 150°–400° C., preferably about 130°–350° C. at the middle ⅓ of the chamber and about 185°–400° C., preferably about 170°–380° C. at the last ⅓ of the chamber.

Filaments are drawn from the spin column i.e. reaction chamber, exit port at a rate of about at least 100 fpm, preferably from about 100–500 fpm, and more preferably from about 175–400 fpm.

Residence time in the reaction chamber is a function of the roll configuration chosen to apply stretching and/or other processing steps thereto while therein, and is not constant for each filament being prepared. However, residence times of from about 30 seconds to 5 minutes have proven sufficient.

The spinnerette size employed is not critical and spinnerettes having hole diameters of 0.05 to 2.0 millimeters have proven satisfactory. Filament deniers of 0.5–1000 are possible.

The ratio of reactant melamine and aldehyde is not critical, however, melamine to aldehyde ratios of from 1:1 to 1:4 are satisfactory. Modifiers, additives, etc. in amounts up to about 50% of the total molten liquid spinnerette feed are tolerable.

Exemplary melamine compounds include 2,4,6-triamino-s-trizaine, and substituted derivatives thereof, such substituents including 1–8 carbon alkyl, allyl, 1–10 carbon aryl, 1–8 carbon halogen substituted alkyls; guanamine and substituted guanamines such diguanamine, acetoguanamine, benzoguanamine etc. and mixtures thereof.

Typical aldehydes or aldehyde generating compounds include saturated and unsaturated aliphatic aldehydes, cyclic and aromatic aldehydes and derivatives thereof such as formaldehyde, acrolein, methylol, glyoxal, acetaldehyde, polyoxymethylene, paraformaldehyde, dioxolane, benzaldehyde, chloral and the like. The preferred species of the melamines and aldehydes are 2,4,6-triamino-s-triazine, and paraformaldehyde.

The filaments produced according to the process of the present invention may be used to manufacture woven fabrics, knitted materials, non-woven fabrics etc. and they may be used alone or in conjunction with other natural or synthetic fibers as is customary in the art.

The following examples are set forth for purposes of illustration only and are not to be construed as limitations on the present invention except as set forth in the appended claims. All parts and percentages are by weight unless otherwise specified.

EXAMPLE 1

Two moles of paraformaldehyde in flake form and one mole of melamine crystals are blended together to form a uniform mixture. The mixture is fed into a one pass, singlescrew extruder at a barrel temperature of 130° C. and a screw speed controlled so as to result in a product residence time of about three minutes. The resultant molten resin is discharged from the reactor and maintained at 110° C. It has melt viscosity of 2500 poise. While at said temperature, the molten resin is fed through a spinnerette having 0.3 mm diameter holes into a reaction chamber thirteen feet in length from spinnerette to exit. Back pressure is maintained at 20 psi. The reaction chamber is maintained at a temperature gradient of 120° C. at the top ⅓ of the column, 300° C. at the middle ⅓ of the column and 300° C. at the bottom ⅓ of the column. Air flow is maintained in a direction from spinnerette to exit at a rate of 20 feet per minute. Residence time of the filament in the reaction chamber is 1 minute and 30 seconds. Stretching of the filament within the chamber is 3X. An excellent filament is recovered.

EXAMPLE 2

The procedure of Example 1 is again followed except that a solid flame-retardant (7%) is admixed with the melamine and paraformaldehyde before charging to the extruder. An excellent filament, having flame-retardant properties, is recovered.

EXAMPLE 3

The procedure of Example 1 is again followed except that 12% of polyvinylalcohol having a degree of polymerization of about 2200 and a degee of saponification of 88 is also charged to the extruder. Excellent results are achieved.

EXAMPLES 4–6

Again following the procedure of Example 3, except that the polyvinyl alcohol is replaced by (4) polyethyleneoxide, (5) polypropyleneoxide and (6) a commercially available, low molecular weight polyamide. In each instance, a fiber of excellent physical and chemical characteristics is recovered.

EXAMPLE 7

The procedure of Example 3 is again followed except that a cross-linking catalyst is incorporated with the melamine and paraformaldehyde. The hot air in the reaction chamber activates the catalyst which, in turn, crosslinks the resultant resinous fiber. The fiber is then crimped and cut as in conventional fiber processing.

I claim:

1. A continuous method for the preparation of a melamine-aldehyde filament which comprises:
   (a) charging a crystalline melamine compound and a solid aldehyde generating compound into a single pass reactor at a temperature ranging from about 120° C. to about 180° C. for from about 30 seconds to about 5 minutes to form a molten liquid having a melt viscosity ranging from about 1000–5000 poises,
   (b) immediately extruding said molten liquid through a spinnerette into a reaction chamber, the first ⅓ of which is maintained at a temperature ranging from about 80°–300° C., the second ⅓ of which is maintained at a temperature ranging from about 150°–400° C. and the third ⅓ of which is maintained at a temperature ranging from about 185°–400° C., in the presence of air, and
   (c) recovering the resultant filament.

2. The method of claim 1 wherein said melamine and said aldehyde generating compound are homogeneously admixed before charging to said reactor.

3. The method of claim 1 wherein the ratio of melamine to aldehyde ranges from about 1:1 to about 1:3, respectively.

4. The method of claim 1 wherein at least one modifier is charged to said reactor with said melamine and said aldehyde.

5. The method of claim 1 wherein the pressure in said reaction chamber is at least 20 psi.

6. The method of claim 1 wherein said air in said reaction chamber flows in the direction of melt entrance to filament exit at a rate of from about 5–50 fpm.

7. The method of claim 1 wherein said melamine is melamine and said aldehyde generating compound is formaldehyde.

8. The method of claim 4 wherein said modifier is a resin.

9. The method of claim 8 wherein said resin is polyvinyl alcohol, polyethylene oxide, polypropylene oxide or a polyamide.

10. A continuous method for the preparation of a melamine-aldehyde resin filament which comprises:
    (a) charging a crystalline melamine compound and a solid aldehyde generating compound into a single pass reactor at a temperature ranging from about 120° C. to about 180° C. for from about 30 seconds to about 5 minutes to form a molten liquid having a melt viscosity ranging from abut 1000–5000 poises,
    (b) maintaining the temperature of said molten liquid at from about 80° to 150° C.,
    (c) extruding the resultant temperature-maintained molten liquid through a spinnerette into a reaction chamber, the first ⅓ of which is maintained at a temperature ranging from about 80°–300° C., the second ⅓ of which is maintained at a temperature ranging from about 150°–400° C. and the third ⅓ of which is maintained at a temperature ranging from about 185°–400° C., in the presence of air, and
    (d) recoverying the resultant filament.

* * * * *

UNITED STATES PATENT OFFICE
CERTIFICATE OF CORRECTION

Patent No. 4,497,934          Dated February 5, 1985

Inventor(s) William E. Streetman

It is certified that error appears in the above-identified patent and that said Letters Patent are hereby corrected as shown below:

Claims 2-7, line 1 of each, in each instance, after the numeral "1", insert the words -- or 10 --.

Signed and Sealed this

Twenty-eighth Day of May 1985

[SEAL]

Attest:

DONALD J. QUIGG

Attesting Officer      Acting Commissioner of Patents and Trademarks